United States Patent [19]

Cabeza

[11] 4,340,238

[45] Jul. 20, 1982

[54] SIMULTANEOUS CONNECTION BETWEEN HANDLEBAR AND STEERING FORK OF BICYCLES

[76] Inventor: Maximino R. Cabeza, Calle Central 709, Miramar, Santurce, P.R. 00907

[21] Appl. No.: 87,497

[22] Filed: Oct. 23, 1979

[30] Foreign Application Priority Data

May 16, 1979 [ES] Spain .................................. 239.028

[51] Int. Cl.³ ............................................ B62K 21/18
[52] U.S. Cl. .................................... 280/279; 403/370
[58] Field of Search ...................... 280/279, 280, 274; 403/22, 370 X, 371, 374, 377

[56] References Cited

U.S. PATENT DOCUMENTS 3,260,535 7/1966 Jaulmes .............................. 280/279
3,284,114 11/1966 McCord et al. .................... 403/370

Primary Examiner—Joseph F. Peters, Jr.
Assistant Examiner—Randall A. Schrecengost
Attorney, Agent, or Firm—Scrivener, Clarke, Scrivener and Johnson

[57] ABSTRACT

The disclosure is of a device for connecting the handlebars to the steering fork of a bicycle.

2 Claims, 14 Drawing Figures

SIMULTANEOUS CONNECTION BETWEEN HANDLEBAR AND STEERING FORK OF BICYCLES

BACKGROUND OF THE INVENTION

Conventionally, the bicycle handlebar stem is housed telescopically inside the fork stem and is fastened to the latter by means of a bolt of considerable length, which has a conical nut corresponding to the lower neck of the handlebar stem and which goes through the upper end of the stem where it has an operating head. Under these conditions, when the bolt is turned there is a movement of the conical nut that deforms the lower neck of the handlebar stem causing it to be tightened against the inside wall of the fork stem.

In racing bicycles, in which it is desirable to reduce weight to a minimum, the use of the fastening bolt is not worthwhile as this bolt must have a considerable length, slightly greater than that of the handlebar stem and also a considerable cross-section to support the stresses to which it must be subjected, which results in considerable weight. It has also been proposed to fasten the fork stem to the handlebar stem with a biconical washer that is placed between the upper race housing of the steering, and a stem tightening counternut that is also screwed on the fork stem. Further, the fork stem in its upper end has four cuts in the direction of the generatrices end of considerable amplitude, intended to permit deformations of the stem for its tightening against the handlebar stem, when tightening of the biconical washer is caused by the counternut.

Obviously, the cuts made in the fork stem cause considerable weakening of it so that, even though there is provided at the bottom of the cuts a circular perforation with a diameter slightly larger than the width of the cut, it is obvious that these perforations are not sufficient to prevent such weakening, as any hardened metal that has a structural crack and has to support load and bending with constant variations caused by impacts and vibrations, is capable of breaks extending said cut.

The device for simultaneous tightening of the bicycle steering unit and handlebar stem according to the invention provides maximum guarantees of reliability in tightening and fastening and eliminates the cuts in the fork stem, whereby the strength of the bicycle is increased.

SUMMARY OF THE INVENTION

The connection between the hollow cylindrical stem which extends upwardly from the steering fork of a bicycle and the stem which extends downwardly from the handlebars and is telescopically received within the fork stem is provided by a split contractile ring which surrounds and bridges the upper end of the fork stem and the adjacent part of the handlebar stem and has at least one frusto-conical external surface. The ring is surrounded by a nut which is connected to the steering fork and which has an internal frusto-conical surface which engages the frusto-conical surface of the split ring whereby movement of the nut over the ring causes relative movement of the frusto-conical surfaces causing contraction of the split ring and resultant connection of the two stems.

DESCRIPTION OF THE INVENTION

Figure 1:
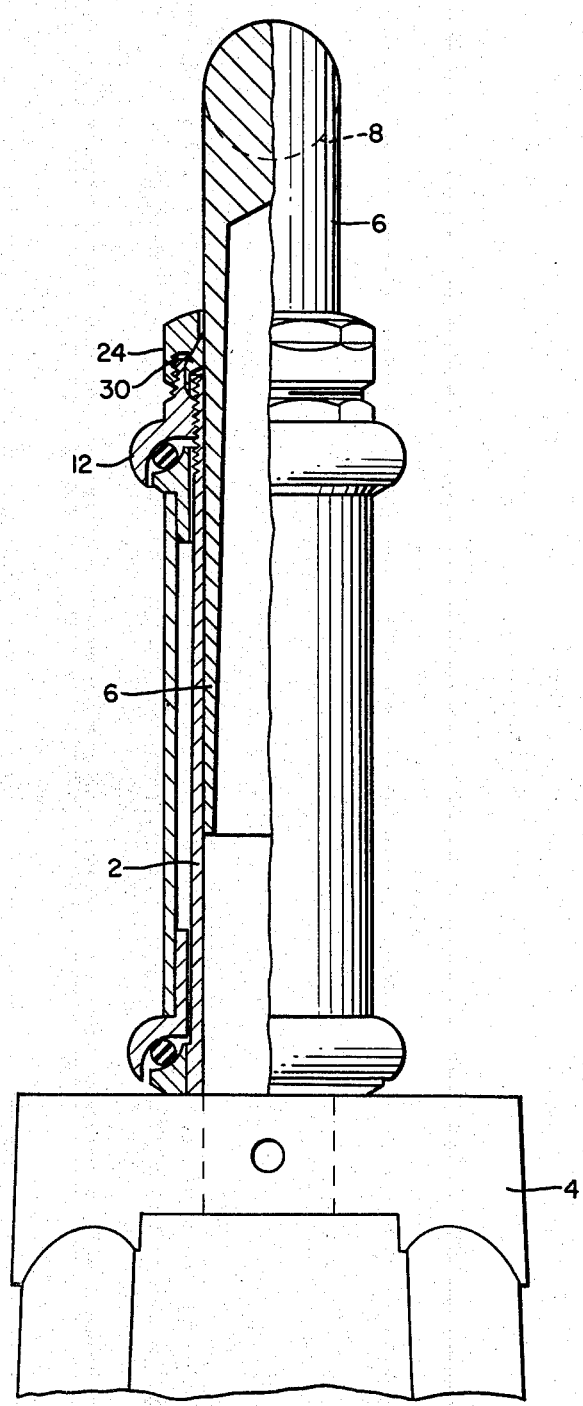
FIG. 1 shows in front elevation view and quarter section a bicycle steering apparatus in which connection of it to the handlebar stem is performed by the device which is provided by the present invention.
Figure 3:
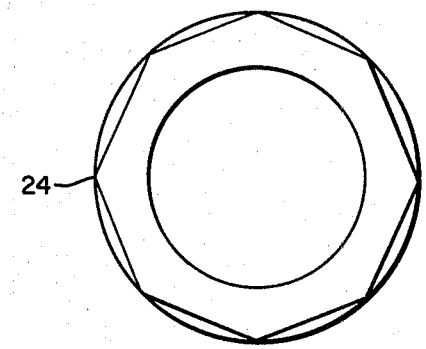
Figure 4:
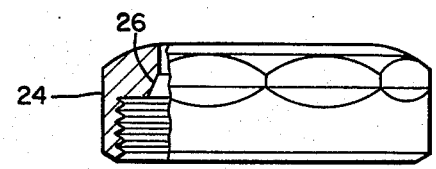
Figure 5:
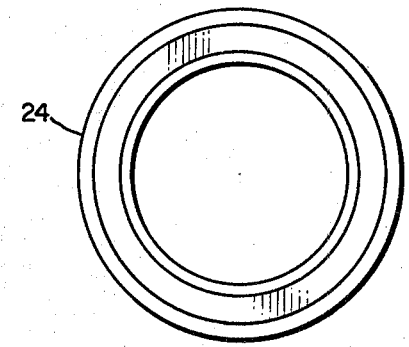
Figure 2:
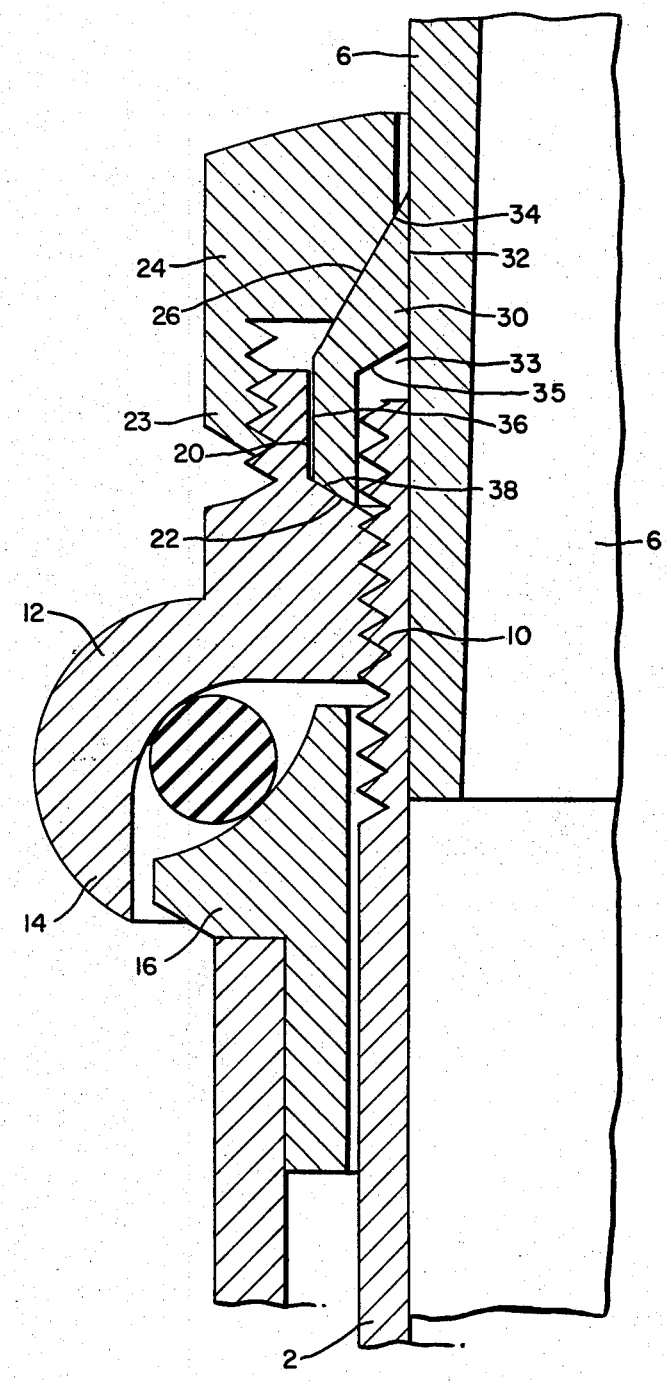
FIG. 2 is an enlarged view of parts shown in FIG. 1, FIGS. 3, 4 and 5 are top, lateral and lower views of the tightening nut of the device.
Figure 6:
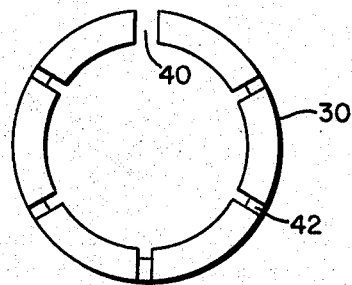
FIGS. 6, 7 and 8 are top, lateral and lower views of the clamp.
Figure 7:
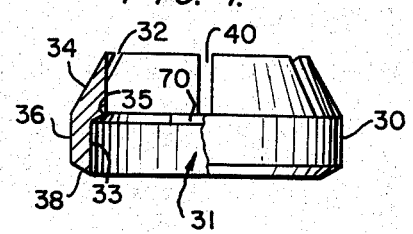
Figure 8:
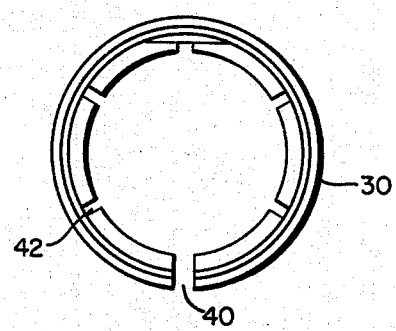
Figure 9:
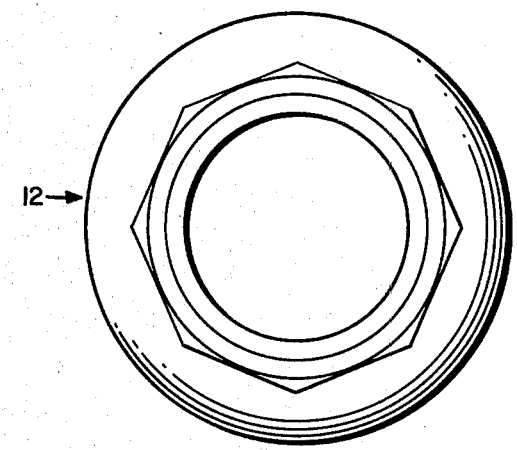
FIGS. 9, 10 and 11 are top, lateral and lower views of the race housing.
Figure 10:
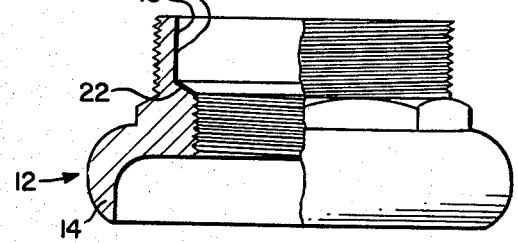
Figure 11:
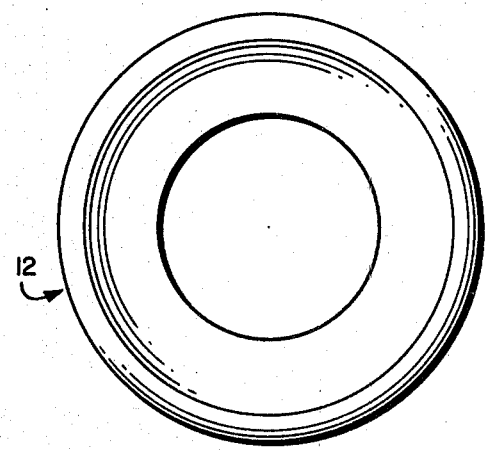

In the embodiment of the invention disclosed in FIGS. 1 to 13 the hollow cylindrical stem 2 extends upwardly from the steering fork 4 of the front wheels of the bicycle and receives the cylindrical stem 6 which extends downwardly from the bicycle handlebars 8. At its upper end part the fork stem 2 is provided with an external screw thread 10 by which it is connected to an annular race housing 12 by means of internal screw threads on the housing. At its lower part the housing is shaped to provide the rotatable element 14 of a ball race, the other fixed element of which is shown at 16. The upper part of the race housing is formed internally with an annular recess having a central annular surface 20 and a lower frusto-conical surface 22 which tapers downwardly toward the fork. The upper part of the race housing is also provided externally with a screw thread by which it is connected to the internal screw threads on the lower extension part 23 of a nut 24 which extends upwardly from the race housing and is provided with an upper internal frusto-conical surface 26.

Figure 12:
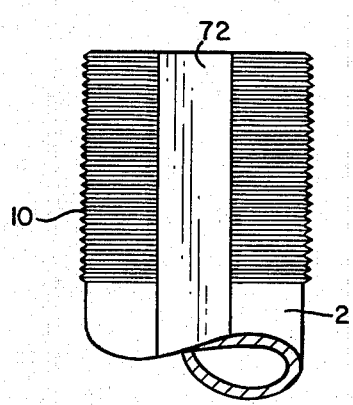
FIG. 12 shows a detail in lateral elevation of the fork stem.
Figure 13:
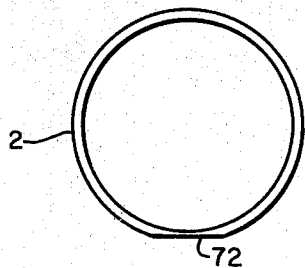
FIG. 13 shows a plan view of the stem.

Within the internal groove formed by surfaces 26, 20, 22 there is positioned an annular clamping ring 30 which has an internal axially extending cylindrical surface 32 which engages the external cylindrical surface of the handlebar stem 6, and below surface 32 an annular cut-out part 33 which receives the upper annular end of the hollow cylindrical wall of the fork stem 2 and surrounds the upper end of that stem. The external surfaces of the clamping ring comprise upper frusto-conical surface 34 which engages the correspondingly shaped internal surface 26 of the nut 24, a central annular cylindrical surface 36 which engages the correspondingly shaped central surface 20 of the race housing, and a lower frustro-conical shaped surface 38 which engages the correspondingly shaped surface 22 of the race housing. The clamping ring is split at 40 and in its upper part is also provided with an annular series of radial cuts 42. Between the upper internal surface 32 and the wall of the cut-out part 33 there is an inwardly inclined annular surface 35 which at a part of its length is cut away along a chord line to form a flat surface 70 which may be positioned in surface-to-surface engagement with the flat surface 72 formed on the outer surface of the fork stem 2, as shown in FIGS. 12 and 13, in order to prevent relative rotation between the two parts.

In assembling the described parts the race housing part 12 is first put in position surrounding and attached by screw threading to the fork stem 2, and the clamping ring 30 is next put in place with its external surfaces 36, 34 38 engaging surfaces 26 20, 22 of the race housing but with the ring not in engagement with the upper end of the fork stem 2. The nut 24 is now put in place and connected to the race housing by the screw threads, the handlebar stem 6 is now introduced into the fork stem 2 to a suitable position in vertical height, and the nut 24 is then turned in the tightening direction toward the race housing. This forces the clamping ring downwardly but it is unable to move in that direction because it engages the race housing surface 22 and nut surface 26 therefore bears on clamping ring surface 34 forcing the upper part of the clamping ring radially inwardly against the handlebar stem 6 and fork stem 2, thereby connecting them.

Figure 14:
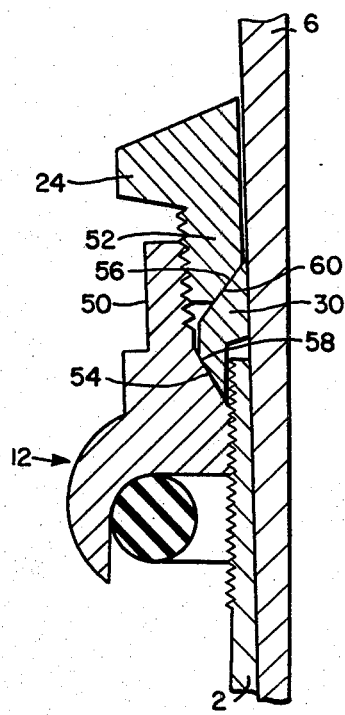
FIG. 14 is a partial vertical sectional view of a second embodiment of the invention.

In the embodiment of the invention disclosed in FIG. 14 the upper annular part 50 of the race housing 12 is connected by internal screw threads to external screw threads on the downwardly extending cylindrical part 52 of nut 24. Internal frusto-conical surfaces 54, 56 on the race housing and nut 24 engage correspondingly shaped external surfaces 58, 60 on clamping ring 30, thus eliminating parts of the internal groove in the clamping ring.

I claim:

1. In combination with the upwardly extending hollow un-slotted cylindrical stem of the steering fork of the front wheels of a bicycle, and the downwardly extending un-slotted cylindrical handlebar stem which is positioned within the fork stem, means for connecting the two stems comprising:
   a. a split ring having a lower part surrounding the upper end of the fork stem and an upper part surrounding the adjacent part of the handlebar stem, and having on its upper part a conical external surface,
   b. the upper part of the split ring having an annular series of radial cuts,
   c. a race housing surrounding and connected to the steering fork and having a fixed abutment engaging the lower end of the split ring,
   d. a nut surrounding the split ring and threaded to the race housing for movement toward and away from the split ring,
   e. the nut having a conical internal surface engaging the conical external surface of the split ring whereby movement of the nut toward the race housing contracts the upper part of the split ring into engagement with the fork stem and the handlebar stem to connect them.

2. The connecting means according to claim 1, in which the lower internal part of the split ring and the adjacent part of the fork stem have complementary flat surfaces which, when in surface-to-surface engagement, prevent relative rotation of the two parts.

* * * * *